(12) United States Patent
Whyte et al.

(10) Patent No.: US 11,567,848 B2
(45) Date of Patent: Jan. 31, 2023

(54) DATA TRANSMISSION

(71) Applicant: Cirrus Logic International Semiconductor Ltd., Edinburgh (GB)

(72) Inventors: Neil Whyte, Edinburgh (GB); Andy Brewster, Edinburgh (GB); Jens Puchert, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 132 days.

(21) Appl. No.: 17/106,324

(22) Filed: Nov. 30, 2020

(65) Prior Publication Data

US 2022/0171691 A1  Jun. 2, 2022

(51) Int. Cl.
| | |
|---|---|
| *G06F 11/00* | (2006.01) |
| *G06F 11/30* | (2006.01) |
| *G06F 11/07* | (2006.01) |
| *G06F 11/16* | (2006.01) |
| *G06F 13/24* | (2006.01) |
| *G06F 13/42* | (2006.01) |

(52) U.S. Cl.
CPC ...... *G06F 11/3027* (2013.01); *G06F 11/0772* (2013.01); *G06F 11/1687* (2013.01); *G06F 13/24* (2013.01); *G06F 13/4291* (2013.01)

(58) Field of Classification Search
CPC .. G06F 13/24; G06F 11/0772; G06F 11/3027; G06F 11/1687; G06F 15/163; G06F 13/4282; G06F 13/1689; G06F 13/00
See application file for complete search history.

(56) References Cited

U.S. PATENT DOCUMENTS

| | | | | |
|---|---|---|---|---|
| 2003/0223466 A1* | 12/2003 | Noronha, Jr. | ........ | H04N 21/242 370/537 |
| 2004/0120251 A1* | 6/2004 | Shanley | .............. | H04L 12/5601 370/225 |
| 2015/0120975 A1 | 4/2015 | Sengoku | | |
| 2016/0142536 A1* | 5/2016 | Bendi | .................... | H04L 67/148 455/411 |
| 2020/0379852 A1* | 12/2020 | Yang | ..................... | G06F 11/187 |

OTHER PUBLICATIONS

Combined Search and Examination Report under Sections 17 and 18(3), UKIPO, Application No. GB2114244.3, dated Jun. 14, 2022.

* cited by examiner

*Primary Examiner* — Charles Ehne
(74) *Attorney, Agent, or Firm* — Jackson Walker L.L.P.

(57) ABSTRACT

A device, comprising: a main module; a plurality of secondary modules; and a data bus configured to enable data transmission between the main module and the plurality of secondary modules over a data line of the data bus; wherein each of the plurality of secondary modules is configured with a unique secondary address used by the main module to communicate with the respective secondary module over the data line, wherein the main module is operable to configure a first two or more of the plurality of secondary modules with a first common secondary address for simultaneous data transmission from the main module to the first two or more of the plurality of secondary modules over the data line.

19 Claims, 7 Drawing Sheets

| Step | No. of writes | Action | Module address | Mod #1 | Mod #2 |
|---|---|---|---|---|---|
| 302 | 1 | Configure Mod #1 to allow broadcast and set common address to x68 | x80 | Response | No response |
| 304 | 1 | Configure Mod #2 to allow broadcast and set common address to x68 | x82 | No response | Response |
| 306 | 1 | Enable 2 wire error IRQ in Mod #1 and Mod #2 | x68 | Response | Response |
| 308 | 1000's | Program RAM in Mod #1 and Mod #2 | x68 | Response | Response |
| 310 | 1 | Disable 2 wire error IRQ in Mod #1 and Mod #2 | x68 | Response | Response |
| 312 | 1 | Configure Mod #1 and Mod #2 to disallow broadcast | x68 | Response | Response |
| 314 | 0 | Host check IRQ subsystem: download was error free if no IRQ received | N/A | N/A | N/A |

Fig. 5

| Step | No. of writes | Action | Module address | Mod #1 | Mod #2 | Mod #3 | Mod #4 |
|---|---|---|---|---|---|---|---|
| 902 | 1 | Configure Mod #1 to allow broadcast and set common address to x68 | x80 | R | N | N | N |
| 904 | 1 | Configure Mod #2 to allow broadcast and set common address to x68 | x82 | N | R | N | N |
| 906 | 1 | Configure Mod #3 to allow broadcast and set common address to x70 | x84 | N | N | R | N |
| 908 | 1 | Configure Mod #3 to allow broadcast and set common address to x70 | x86 | N | N | N | R |
| 910 | 1 | Enable 2 wire error IRQ in Mod #1 and Mod #2 | x68 | R | R | N | N |
| 912 | 1000's | Program RAM in Mod #1 and Mod #2 | x68 | R | R | N | N |
| 914 | 1 | Disable 2 wire error IRQ in Mod #1 and Mod #2 | x68 | R | R | N | N |
| 916 | 0 | Host check IRQ subsystem: download to Mods #1&2 was error free if no IRQ received | N/A | | | | |
| 918 | 1 | Enable 2 wire error IRQ in Mod #3 and Mod #4 | x70 | N | N | R | R |
| 920 | 1000's | Program RAM in Mod #3 and Mod #4 | x70 | N | N | R | R |
| 922 | 1 | Disable 2 wire error IRQ in Mod #1 and Mod #2 | x70 | N | N | R | R |
| 924 | 0 | Host check IRQ subsystem: download was error free if no IRQ received | N/A | | | | |
| 926 | 1 | Configure Mod #1 and Mod #2 to disallow broadcast | x68 | R | R | N | N |
| 928 | 1 | Configure Mod #3 and Mod #4 to disallow broadcast | x70 | N | N | R | R |

Fig. 9

DATA TRANSMISSION

TECHNICAL FIELD

The present disclosure relates to methods and apparatus for transmitting data over a two-wire bus.

BACKGROUND

Two-wire communication buses, comprising a clock line and a data line, are commonly used for synchronous serial data transfer between integrated circuits (ICs). Such solutions allow a main (or control) device or module to communicate with multiple secondary (or responder) devices or modules over the shared data line, each secondary device designated a unique address used by the main device to communicate with specific secondary devices.

Since communication between the main device and each of the secondary devices can only be performed sequentially, two-wire communication protocols suffer from data throughput limitations. Data throughput can be increased by increasing clock speed. However, there is a limit to the speed at which state-of-the-art two-wire systems can be clocked.

SUMMARY

According to a first aspect of the disclosure, there is provided a device, comprising: a main module; a plurality of secondary modules; and a data bus configured to enable data transmission between the main module and the plurality of secondary modules over a data line of the data bus; wherein each of the plurality of secondary modules is configured with a unique address, the unique address used by the main module to communicate with the respective secondary module over the data line, wherein the main module is operable to configure a first two or more of the plurality of secondary modules with a first common address for simultaneous data transmission from the main module to the first two or more of the plurality of secondary modules over the data line.

The data bus may be a two-wire bus comprising the data line for transmission of data signals and a clock line for transmission of clock signals.

The main module may be operable to configure the first two or more of the plurality of secondary modules with the first common address during start-up of the main module.

The main module may be operable to configure the first two or more of the plurality of secondary modules with the first common address during a transition event associated with the device.

The transition event may comprise a transition between a voice call and music playback, or a change in device orientation.

Configuring of the first two or more of the plurality of secondary modules with the first common address may comprise assigning the first common address to the first two or more of the plurality of secondary modules.

Configuring of the first two or more of the plurality of secondary modules with the first common address may comprise enabling or disabling the first common address or assigning the first common address to the first two or more of the plurality of secondary modules.

The main module may be configured to enable the first common address during a firmware update of the first two or more of the plurality of secondary modules.

The main may be further configured to transmit data simultaneously over the data line to the first two or more of the plurality of secondary modules over the data line using the first common address.

Subsequent to transmitting data to the first two or more of the plurality of secondary modules, the main module may be configured to monitor for an error signal from one or more of the first two or more of the plurality of secondary modules.

The device may further comprise an interrupt line, the main module configured to monitor for the error signal on the interrupt line.

The main module may be operable to configure a second two or more of the plurality of secondary modules with a second common address for simultaneous data transmission from the main module to the second two or more of the plurality of secondary modules over the data line.

The plurality of secondary modules may each comprise an amplifier.

The device may further comprise a plurality of transducers. Each amplifier may be configured to drive one of the plurality of transducers.

The main module may comprise an application processor.

The device may comprise one of a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a data bus configured to enable data transmission between a main module to a plurality of secondary modules over a data line of the data bus, wherein each of the plurality of secondary modules is configured with a unique address used by the main module to communicate with the respective secondary module, wherein two or more of the plurality of secondary modules have a common address configurable by the main module for transmission of data simultaneously to the two or more of the plurality of secondary modules over the data line.

According to another aspect of the disclosure, there is provided a main module configured to communication with a plurality of secondary modules via a data bus comprising a data line; wherein the main module is configured to communicate with each of the plurality of secondary modules using a unique address associated with each respective secondary module, wherein the main module is operable to configure a first two or more of the plurality of secondary modules with a first common address for simultaneous data transmission from the main module to the first two or more of the plurality of secondary modules over the data line.

The main module may be an application processor.

According to another aspect of the disclosure, there is provided a secondary module configured to communicate with a main module via a data bus comprising a data line, wherein the secondary module is configured with a unique address used by the main module to communicate with the secondary module, wherein the secondary module is configurable with a common address shared between the secondary module and one or more other secondary modules configured to communicate with the main module via the data bus, wherein the common address is configurable by the main module for transmission of data simultaneously to the secondary module and the one or more other secondary modules over the data line.

The secondary module may comprise an amplifier for driving a transducer.

According to another aspect of the disclosure, there is provided a device comprising: the data bus described above, the main module described above; and the secondary module described above.

According to another aspect of the disclosure, there is provided a method of data transmission over a data bus configured to enable data transmission between a main module and a plurality of secondary modules over a data line of the data bus, the method comprising: configuring each of the plurality of secondary modules with a unique address, the unique address used by the main module to communicate with the respective secondary module over the data line; and configuring, using respective unique addresses, a first two or more of the plurality of secondary modules with a first common address for simultaneous data transmission from the main module to the first two or more of the plurality of secondary modules over the data line.

The method may further comprise: using the first common address, simultaneously transmitting data from the main module to the first two or more of the plurality of secondary modules over the data line.

Subsequent to transmitting data to the first two or more of the plurality of secondary modules, the method may further comprise monitoring, for example at the main module, for an error signal from one or more of the first two or more of the plurality of secondary modules.

The data bus may be a two-wire bus comprising the data line for transmission of data signals and a clock line for transmission of clock signals.

Configuring of the first two or more of the plurality of secondary modules with the first common address may be performed during a start-up of the main module.

Alternatively or additionally, configuring of the first two or more of the plurality of secondary modules with the first common address may be performed during a transition event associated with the device. The transition event may comprise a transition between a voice call and music playback, or a change in device orientation.

Configuring of the first two or more of the plurality of secondary modules with the first common address may comprise assigning the first common address to the first two or more of the plurality of secondary modules.

Configuring of the first two or more of the plurality of secondary modules with the first common address may comprise enabling or disabling the first common address or assigning the first common address to the first two or more of the plurality of secondary modules.

The first common address may be enabled during a firmware update of the first two or more of the plurality of secondary modules.

The method may further comprise configuring, using respective unique addresses, a second two or more of the plurality of secondary modules with a second common address for simultaneous data transmission from the main module to the second two or more of the plurality of secondary modules over the data line.

The plurality of secondary modules may each comprise an amplifier.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which:

FIG. 5 is a table showing instructions in the process of FIG. 4;

FIG. 9 is a table showing instruction steps performed by the main module in the bus architecture shown in FIGS. 7 and 8.

DESCRIPTION OF EMBODIMENTS

Embodiments of the present disclosure relate to improvements in two-wire serial data communication protocols. The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
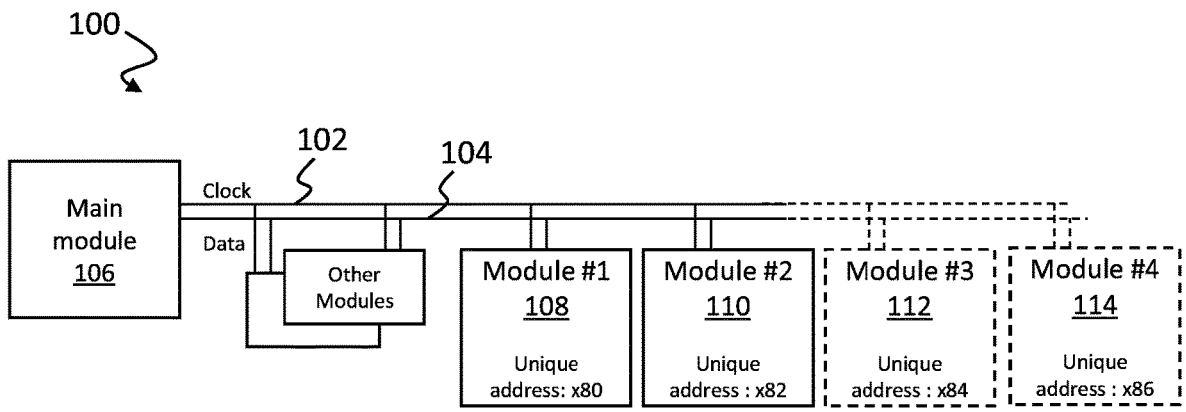
FIG. 1 is a schematic diagram of a state-of-the-art two-wire bus architecture.

FIG. 1 is a schematic diagram of a prior art two-wire serial bus architecture 100. The serial bus comprises a clock line 102 and a data line 104. A main module 106, (also known in the art as a control module, or a primary module, or a host module, or a master module) communicates with a plurality of secondary modules 108, 110, 112, 114 (also known in the art as responder modules or slave modules) over the data line 104. In the example shown, a single main module 106 is provided. However, in practice, more than one main module can be provided. In the example shown, four secondary modules are provided. However, in practice, any number of secondary modules may be connected to the clock and data lines 102, 104. Each of the secondary modules 108, 110, 112, 114 has a unique address (i.e. identifier) to which they are configured to respond. Each unique address is locally unique to the bus upon which the main module 106 and the secondary modules 108, 110, 112, 114 communicate. In other words, each unique address is not shared by any two modules coupled to the data line 104. To send data to one of the secondary modules 108, 110, 112, 114, the main module 106 may transmit the module address of one of the secondary modules 108, 110, 112, 114 over the data line 104 followed by bytes of data. Responsive to detecting the unique address on the data line 104, the addressed secondary module may then be configured to acknowledge the transmission and receive and process subsequent data sent over the data line 104.

Figure 2:
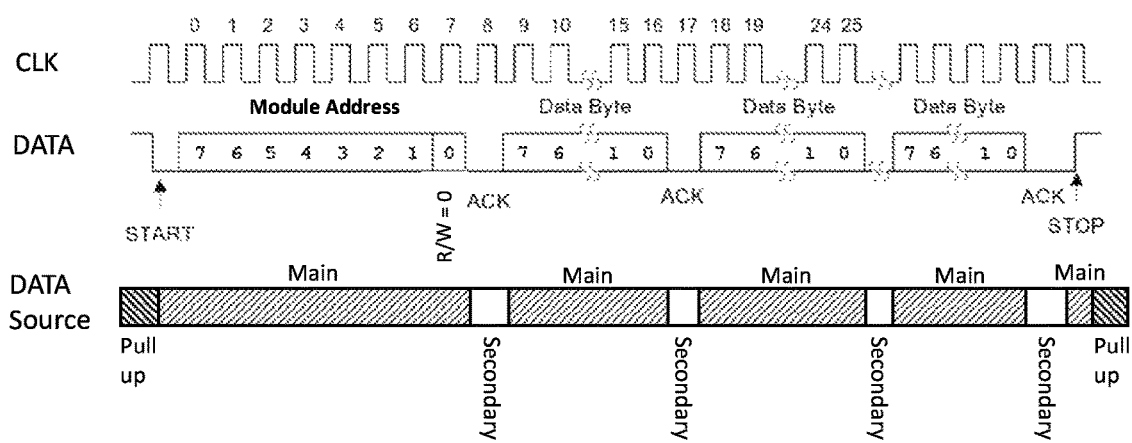
FIG. 2 is a timing diagram for a two-wire bus architecture.

FIG. 2 is a timing diagram illustrating an example of the above data transmission protocol. Each of the main module 106 and the secondary modules 108, 110, 112, 114 may comprise an open drain driver (not shown) as is known in the art. As such, when no transmission is taking place, the data line 104 is held high by pullup resistors of the open drain drivers of the secondary module 108, 110, 112, 114. The main module 106 initiates transmission of a unique address on the data line 104. Upon detecting its unique address transmitted over the data line 104, the relevant secondary module may respond by pulling the data line 104 low. In response to the acknowledgement by the relevant secondary module, the main module 106 then transmits one or more data bytes over the data line 104 which may then be received and processed by the relevant secondary module, each byte acknowledged by the secondary module (e.g. by pulling the data line 104 low) upon successful receipt. Once transmission is complete, the data line 104 is pulled high by the pullup resistors of the respective open drain drivers until the next data transmission. This process may then be repeated for subsequent transmissions from the main module 206 over the data line 104.

It will be appreciated that the architecture 100 described above suffers from data throughput limitations in that data transmission between the main module 106 and each of the secondary modules 108, 110, 112, 114 can only be performed sequentially, using one unique address at a time.

Embodiments of the present disclosure aim to address or at least ameliorate these limitations by implementing a novel two-wire bus protocol in which secondary modules are provided both with a unique address (locally unique to each secondary module) and a common address (common to two or more secondary modules connected to a two-wire bus). A main module may be configured to enable and disable the use of one or more common addresses to allow substantially simultaneous data transfer between the main module and some or all of the secondary modules 208, 210, 212, 214 on the bus. By enabling simultaneous data transfer to multiple secondary modules, common instructions (such as programming instructions) can be relayed to multiple secondary modules in one go, reducing overall time required to program multiple secondary modules.

Figure 3:
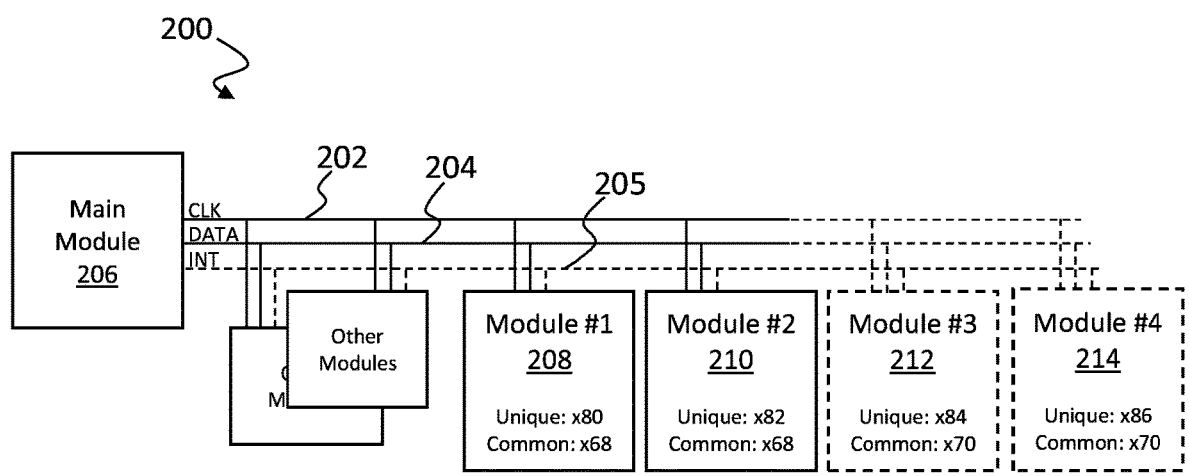
FIG. 3 is a schematic diagram of a two-wire bus architecture according to embodiments of the present disclosure.

FIG. 3 is a schematic diagram of a two-wire serial bus architecture 200 according to embodiments of the disclosure. Like the architecture 100 shown in FIG. 1, the architecture 200 comprises a clock line 202 and a data line 204. A main module 206 communicates with a plurality of secondary modules 208, 210, 212, 214 over the data line 204. In the example shown, a single main module 206 is provided. However, in practice, more than one main module can be provided. In the example shown, four secondary modules 208, 210, 212, 214 are provided. However, in practice, any number of secondary modules may be connected to the clock and data lines 202, 204. Each of the secondary modules 208, 210, 212, 214 has a unique address (i.e. identifier) to which they are configured to respond. Each unique address may be locally unique to the bus upon which the main module 206 and the secondary modules 208, 210, 212, 214 communicate, so as to allow the main module 206 to address instructions to each of the secondary modules 208, 210, 212, 214. In other words, each unique address is not shared by any other module coupled to the data line 204.

In addition to each secondary module 208, 210, 212, 214 having a unique address, in contrast to the secondary modules 108, 110, 112, 114 in FIG. 1, the secondary modules 208, 210, 212, 214 may also be provided with a configurable common address (e.g. x68 or x70). In the example shown in FIG. 2, first and second secondary modules 208, 210 share a first common address x68 and third and fourth secondary modules 212, 214 share a second common address x70 different to the first common address x68. It will be appreciated, however, that common addresses may be assigned to any subset of the secondary modules 208, 210, 212, 214. For example, a single common address may be assigned to all of the secondary modules 208, 210, 212, 214. For example, one common address may be assigned to the first secondary module 208 and another common address may be assigned to the second, third and fourth secondary modules 210, 212, 214. In another example, a common address may be assigned only to some but not all of the secondary modules 208, 210, 212, 214.

In each data transmission, the main module 206 transmits data over the data line 204. Due to this, it will be appreciated that all of the secondary modules 208, 210, 212, 214 will receive the data over the data line 204. However, each message will only be acted upon by the ones of the secondary modules 208, 210, 212, 214 to which the message is addressed. To that end and as noted above, each data transmission by the main module 206 over the data line 206 comprises an address (unique or common).

To address data to only one of the secondary modules 208, 210, 212, 214, the main module 206 may transmit the unique address of one of the secondary modules 208, 210, 212, 214 over the data line 204 followed by bytes of data. For example, to send data to the first module 208, the main module 206 may transmit the address x80 over the data line 204. Responsive to receiving the address x80, the addressed secondary module 208 may then be configured to acknowledge the transmission and receive and process subsequent data sent over the data line 204. This data transmission may operate in a similar manner to that described above with reference to FIG. 2.

To address data to two or more of the secondary modules 208, 210, 212, 214, the main module 206 may transmit the common address of two or more of the secondary modules 208, 210, 212, 214 over the data line 204 followed by bytes of data. For example, to send data to the first and second secondary modules 208, 210 shown in FIG. 3, the main module 206 may transmit the address x68 over the data line 204. The first and second secondary modules 208, 210 may then receive and process subsequent data sent over the data line 204, as will be described in more detail below.

As mentioned above, each of the common addresses x68, x70 may be configurable in that they may be assigned, enabled and/or disabled at each of the secondary modules 208, 210, 212, 214. When a common address is enabled at a secondary module of the secondary modules 208, 210, 212, 214, that secondary module may be responsive to instructions transmitted by the main module 206 addressed to the common address assigned to that secondary module. Configuration of a common address at one of the secondary modules 208, 210, 212, 214 may be performed by the main module 206 transmitting an instruction including the unique address of the respective one of the secondary modules 208, 210, 212, 214 which the main module 206 wishes to configure. Once the common address has been enabled at two or more of the secondary modules 208, 210, 212, 214, the main module 206 may then transmit an instruction comprising the common address and the common data intended for the two or more of the secondary modules 208, 210, 212, 214. Transmission of data intended for two or more of the secondary modules 208, 210, 212, 214 may be referred to herein as a broadcast. The main module 206 may also be configured to assign and reassign common addresses to one or more of the secondary modules 208, 210, 212, 214.

As will become evident in the following examples, during a broadcast (e.g. a data transmission from the main module 206 intended for multiple ones of the secondary modules 208, 210, 212, 214), the conventional acknowledgement of receipt described above with reference to FIG. 2 is not possible. This is because where multiple secondary modules are configured for receipt of a transmission, no distinction can be made as to which one (or more than one) of the secondary modules 208, 210, 212, 214 are pulling the data line 204 low to acknowledge receipt of a transmission.

Optionally, therefore, a novel interrupt technique may be implemented using an interrupt request (IRQ) line 205. The IRQ line 205 may be provided in addition to the clock and data lines 202, 204. In which case, the main module 206 may be provided with an interrupt handler configured to handle interrupts associated, for example, with read errors at one or more of the secondary modules 208, 210, 212, 214. Such interrupt handling will be described in more detail below. It is noted that, whilst advantageous, both the IRQ line 205 and the steps described below in relation to interrupts are entirely optional and may be omitted without departing from the scope of the present disclosure.

Figure 4:
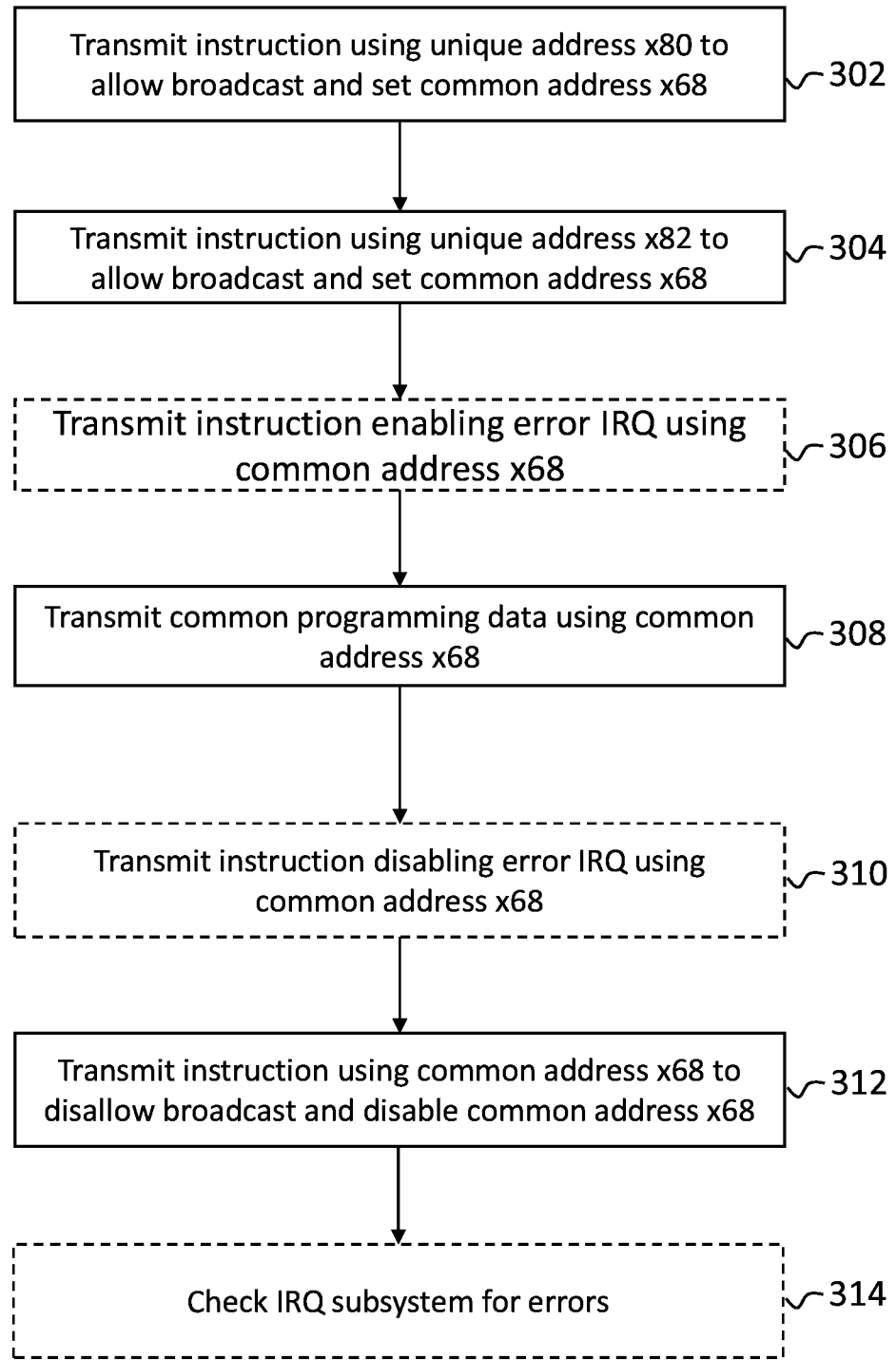
FIG. 4 is a flow diagram for a process performed by a main module using the architecture shown in FIG. 3.

FIG. 4 is a flow diagram illustrating an exemplary method for sending common data from the main module 206 to the first and second secondary modules 208, 210 simultaneously over the data line 204. FIG. 5 is a table mirroring the flow diagram in FIG. 4.

At step 302, the main module 206 may send an instruction over the data line 204 intended for the first secondary module 208 and comprising the first secondary module 208's unique address x80. The instruction may be sent using a similar protocol to that described above with reference to FIG. 2. As is inherent in two-wire bus architectures, the instruction (and every instruction transmitted by the main module 206) is visible to all of the secondary modules 208, 210, 212, 214. However, the instruction may only be actioned by the first secondary module 208, due to the presence of the unique address x80 in the instruction.

The instruction may commence with the unique address x80 of the first secondary module 208. Upon acknowledgement by the first secondary module 208 of receipt of the unique address x80, the main module 206 may send an instruction to the first secondary module 208 to allow broadcasts (i.e. common data transmission) from the main module 206 and to enable the common address x68 at the first secondary module 208. As noted in FIG. 5, whilst all of the secondary modules 208, 210, 212, 214 receive the instruction, in response to transmission of the unique address x80, only the first secondary module 208 responds with acknowledgement. The second, third and fourth secondary modules 210, 212, 214 do not respond.

At step 304, the main module 206 may send an instruction over the data 204 intended for the second secondary module 210 and comprising the second secondary module 210's unique address x82. The instruction may also be sent using a similar protocol to that described above with reference to FIG. 2.

The instruction may commence with the unique address x82 of the first secondary module 208. Upon acknowledgement by the second secondary module 210 of receipt of the unique address x82, the main module 206 may send an instruction to the second secondary module 210 to allow broadcasts (i.e. common data transmission) from the main module 206 and to enable the common address x68 at the second secondary module 210. As noted in FIG. 5, whilst all of the secondary modules 208, 210, 212, 214 receive the instruction, in response to transmission of the unique address x82, only the second secondary module 210 responds with acknowledgement. The first, third and fourth secondary modules 208, 212, 214 do not respond.

Having enabled the common address x68 at the first and second secondary modules 208, 210, the main module 206 is able to transmit a single instruction comprising the common address x68 over the data line 204. Again, this instruction will be received by all of the secondary modules 208, 210, 212, 214. Advantageously however, due to the presence of the common address, x68, the instruction will be substantially simultaneously acted upon by the first and second secondary modules 208, 210. Thus, the first and second secondary modules 208, 210 can be programmed simultaneously using a single instruction transmitted by the main module 206 over the data line 204.

Because the first and second secondary modules 208, 210 are both configured at this stage to act upon instructions comprising the common address x68, the situation arises where read acknowledgements on the data line 204 are no longer reliable. The first and second secondary modules 208, 210 may acknowledge receipt of the common address x68 on the data line 206. However, the main module 206 will not be able to distinguish between one of the first and second secondary modules 208, 210 responding on the data line 206 and both of the first and second secondary modules 208, 210. Because of this, the architecture 200 may implement an alternative technique for determining whether errors have occurred in the reading of instructions sent over the data line 204 from the main module 206.

For example, at step 306, the main module 206 may send an instruction over the data line 206 and comprising the common address x68 to enable interrupt requests. Since the common address x68 is enabled at the first and second secondary modules 208, 210, upon detection of the common address x68 on the data line 204, the first and second secondary modules 208, 210 may then process subsequent instructions from the main module 206 to enable interrupt requests and therefore each enable interrupt requests. With interrupt requests enabled, the first and/or second secondary module 208, 210 may then be configured to transmit an interrupt, for example over the interrupt line 205 on detection of a read error or other error at the respective first and/or second secondary module 208, 210.

In some embodiments, regardless of whether the above described interrupt technique is implemented, the first and second secondary modules 208, 210 may acknowledge detection of the common address x68 on the data line 206. In which case, the main module 206 may continue transmission of the instruction simply if any acknowledgment is received, e.g. if the data line 206 is pulled low or high by any of the first and second secondary modules 208, 210. Alternatively, the main module 206 may ignore any change in voltage in the data line 206 after transmission of a common address and transmit the subsequent instruction regardless of the state of the data line 206 after sending the common address x68. The main module 206 may act similarly in subsequent transmission whilst broadcasting (using the common address x68).

At step 308, the main module 206 then sends common data and/or instructions using the common address x68 over the data line 204. Again, since the common address x68 is enabled at the first and second secondary modules 208, 210, each of the first and second secondary modules 208, 210 receive and process the data sent from the main module 206. Because both the first and second secondary modules 208, 210 may be actively adjusting the data line 206 during acknowledgment of the common address x68, the main module 206 may be configured to respond in either manner described above with reference to step 306.

When the main module 206 has completed transmission of the common data and/or instruction over the data line 204, the process may proceed to optional step 310 or directly to step 312.

At step 310, if interrupt requests were enabled at step 306, then the main module 206 may send an instruction using the common address x68 to disable interrupt requests. Since the common address x68 is enabled at the first and second secondary modules 208, 210, these modules 208, 210 each process the instruction and disable interrupt requests. Because both the first and second secondary modules 208, 210 may both be actively adjusting the data line 206 during acknowledgment of the common address x68, the main module 206 may be configured to respond in either manner described above with reference to step 306.

At step 312, the main module 206 may send an instruction using the common address x68 to disallow broadcasts (i.e. common data transmission) and to disable the common address x68. Since the common address x68 is enabled at the first and second secondary modules 208, 210, these modules 208, 210 each process the instruction and subsequently disable use of the common address x68.

Finally, at step 314, the main module 206 may check an IRQ module implemented by the main module 206 to determine whether an interrupt request has been generated by either of the first and second secondary modules 208, 210 during transmission of common data at step 308. If it is determined that an interrupt has been generated, then the main module 206 may implement an interrupt handler to deal with the interrupt request.

The above process may then be repeated for transmission of common data intended for the third and fourth secondary modules 212, 214 using the common address x70. It will be appreciated that the above process may be performed for transmission of common data between the main module 26 and two or more of the secondary modules 208, 210, 212, 214 depending on the configuration of common addresses at the secondary modules 208, 210, 212, 214.

Figure 6:
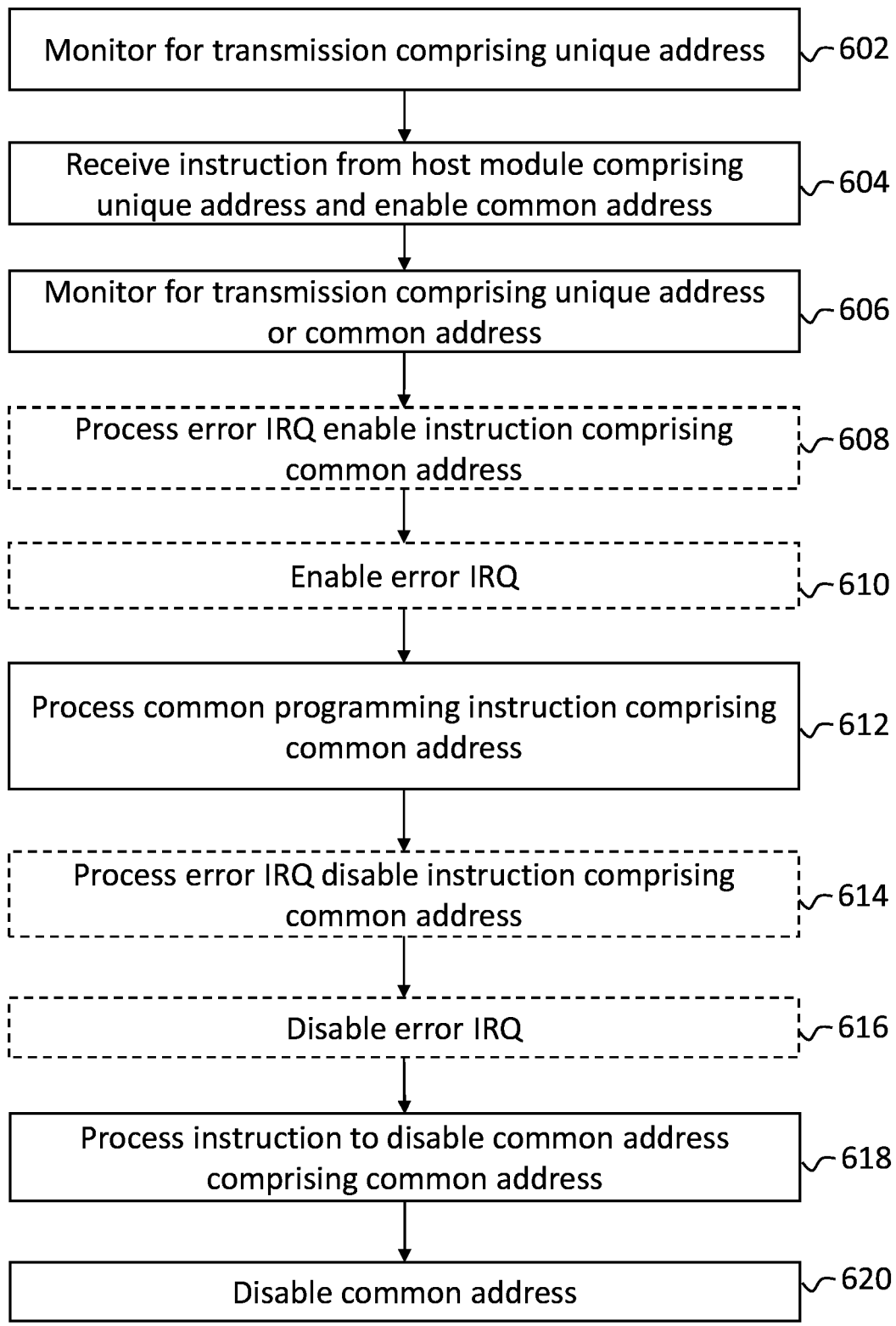
FIG. 6 is a flow diagram for a process performed by a secondary module using the architecture shown in FIG. 3.

FIG. 6 is a flow diagram showing a process which may be performed by one of the secondary modules 208, 210, 212, 214 to process data broadcast by the main module 206 over the data line 204. Data transmission and handoff between the main module 206 and the each of the secondary modules 208, 210,212, 214 has been explained above with reference to FIG. 4 and so will not be repeated again in the below explanation. Whilst the following explanation is from the perspective of the first secondary module 208, the process 600 may be performed by any one of the secondary modules 208, 210, 212, 214.

At step 602, the first secondary module 208 may monitor for transmission of its unique address x80 on the data line 206.

At step 604, the first secondary module 208 may detect its unique address x80 on the data line 206, acknowledge receipt and process a subsequent instruction to enable the common address x68. The first secondary module 208 may then enable the common address x68.

At step 606, the first secondary module 208 may then monitor for transmission of both its unique address x80 and its common address x68 on the data line 206. It will be appreciated that each of the secondary modules 208, 210, 212, 214 is configured to continuously monitor for their respective unique addresses x80, x82, x84, x86 on the data line as well as their common address, if assigned and enabled.

At step 608, the first secondary module 208 may detect an instruction on the data line 206 comprising the common address x68 and an instruction to enable error interrupts. It will be appreciated that any other of the secondary modules 210, 212, 214 having the same common address x68 may also be configured to detect the instruction and respond in a similar manner to that of the first secondary module 208.

At step 610, the first secondary module 208 may then enable error interrupts. With interrupt requests enabled at the first secondary module 208, when an error occurs at the first secondary module 208 when reading broadcast instructions transmitted with the common address x68, the first secondary module 208 may flag the error, for example on the IRQ line 205. An error may be flagged by pulling the IRQ line 205 high or low.

At step 612, the first secondary module 208 may detect an instruction on the data line 206 comprising the common address x68 and proceed to receive and process data broadcast over the data line 206. This data will substantially simultaneously be processed by the second secondary module 210 having the same common address x68. This data will also be received by the third and fourth secondary modules 212, 214, but not processed by these secondary modules 212, 214.

After transmission of the common data at step 612 has ceased, at step 614, the first secondary module 208 may detect an instruction on the data line 206 comprising the common address x68 and an instruction to disable error interrupts.

At step 616, the first secondary module 208 may then disable error interrupts.

At step 618, the first secondary module 208 may detect an instruction comprising the common address x68 on the data line 206, the instruction to disable use of the common address x68. The first secondary module 208 may then process the instruction to disable the common address x68.

At step 620, the first secondary module 208 may then disable the common address x68.

Thus embodiments of the present disclosure enable multiple modules on a two-wire bus to be programmed with common instructions at the same time. This has particular application where each of the secondary modules 208, 210, 212, 214 are the same or similar modules which require identical or similar configuration.

It will be appreciated that during the process described above with reference to FIG. 6, each of the secondary modules 208, 210, 212, 214 are continuously monitoring for instructions on the data line 204 which include their unique address and common address (if enabled).

Figure 7:
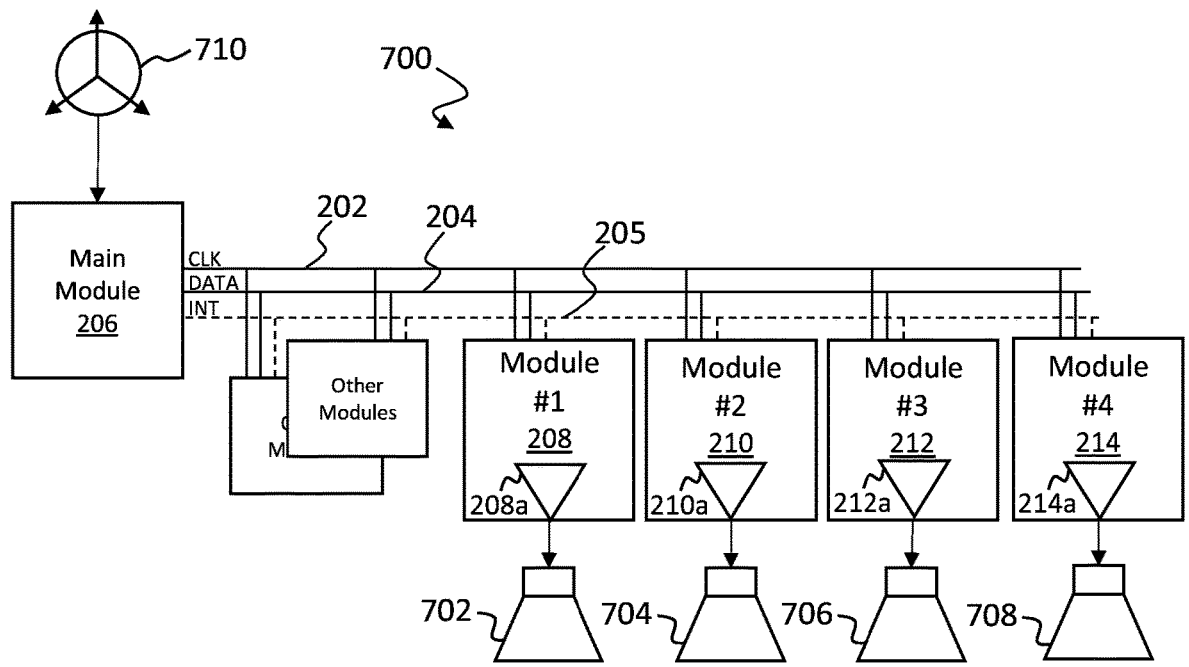
FIG. 7 is a schematic diagram of a device comprising the bus architecture of FIG. 3.
Figure 8:
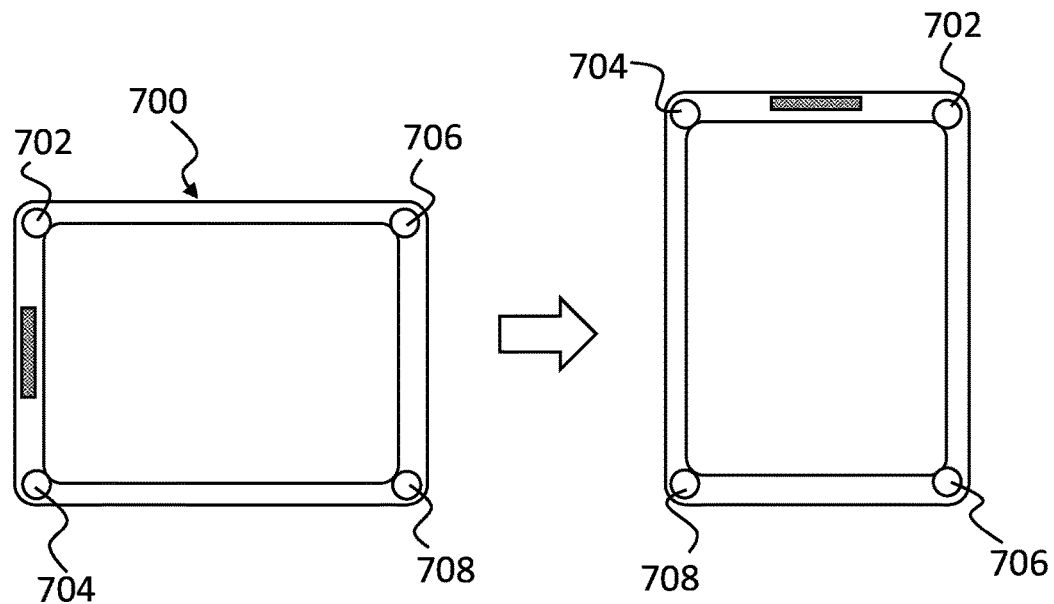
FIG. 8 is a schematic diagram of the device of FIG. 7 changing orientation.

FIGS. 7 and 8 schematically illustrate an example implementation of the architecture 200 in a device 700 comprising a plurality of transducers 702, 704, 706, 708. In this example, each of the secondary modules 208, 210, 212, 214 comprise an amplifier 208a, 210a, 212a, 214a whose parameters may be re-configured based on instructions received over the data line 206 of the bus. As shown in FIG. 8, the transducers 702, 704, 706, 708 may be located on four corners of the device 700. Depending on the orientation of the device 700, it may be desirable to adjust one or more parameters of the amplifiers 208a, 210a, 212a, 214a to enhance the quality of any sound being played back to the user via the transducers 702, 704, 706, 708. For example, when the device 700 is in the orientation shown on the left in FIG. 8, it may be desirable to configure transducers 702 and 706 as a stereo pair and transducers 704 and 708 as a stereo pair. In contrast, when the device 700 is in the orientation shown on the right in FIG. 8, it may be desirable to configure transducers 702 and 704 as a stereo pair and transducers 706 and 708 as a stereo pair.

FIG. 9 is a table showing instruction steps required for an exemplary reconfiguration of the secondary modules 208, 210, 212, 214 of the device 700 after a change of orientation shown from left to right in FIG. 8. In the right four columns of the table, "R" stands for "response" and "N" stands for "no response". The reconfiguration process may be triggered on determination of a change in orientation of the device 700. For example, the main module 206 may receive an orientation signal from an inertial measurements unit (IMU) 710 comprised in the device 700 which may be used to determine an orientation of the device 700.

At steps 902 to 908, instructions may be transmitted by the main module 206 over the data line 206 and intended for each of the secondary modules 208, 210, 212, 214 each instruction comprising one of the secondary modules' 208, 210, 212, 214 respective unique addresses x80, x82, x84, x86. Each instruction may be to allow broadcasts and to set a common address for subsequent addressing by the main module 206. With the device 700 transitioning into portrait orientation (right in FIG. 8), it may be desirable to reconfigure the first and second amplifiers 208a, 210a to have the same equalisation parameters. As such, the first and second secondary modules 208, 210 are set with the same common address x68. Likewise, it may be desirable to reconfigure the third and fourth amplifiers 212a, 214a to have the same equalisation parameters. As such, the third and fourth secondary modules 212, 214 are set to process instructions comprising the same common address, x68.

At step 910, instructions are transmitted over the data line 206 using the common address x68 to enable error interrupts. The first and second secondary modules 208, 210 responsive to detecting the common address x68 on the data line 206, enable error interrupts, for example over the IRQ line 205 (if provided). It will once again be appreciated that the third and fourth secondary modules 212, 214 receive but do not respond to this instruction.

At step 912, the main module 206 then transmits common programming instructions over the data line 206 using the common address x68 intended for the first and second secondary modules 208, 210, providing them with the same parameters with which to set their respective amplifiers 208a, 210a. The first and second secondary modules 208, 210 then update their respective amplifiers 208a, 210a using the parameters received in the instruction.

At step 914, once the programming instructions have been sent to the first and second secondary modules 208, 210, the main module 206 may transmit an instruction intended for the first and second secondary modules 208, 210 using the common address x68. The instruction may be to disable error interrupts. Upon detection of the common address x68 in the instruction, the first and second secondary modules 208, 210 may then disable error interrupts (if provided).

At step 916, the main module 206 may check whether interrupts were received, for example over the IRQ line 205.

At step 918, the main module 206 may transmit an instruction over the data line 204 intended for the third and fourth secondary modules 212, 214 using the common address x70. The instruction may be to enable error interrupts. Upon detection of the common address x70 on the data line 204, the third and fourth secondary modules 212, 214 may then process the instruction and enable error interrupts, for example over the IRQ line 205 (if provided).

At step 920, the main module 206 may then transmit common programming instructions intended for the third and fourth secondary modules 212, 214 using the common address x70. The common programming instructions may provide each module with the same parameters with which to set their respective amplifiers 212a, 214a. The third and fourth secondary modules 212, 214 then update their respective amplifiers 212a, 214a using the parameters received in the instruction.

At step 922, once the programming instructions have been transmitted by the main module 206, the main module 206 may transmit an instruction over the data line 206 intended for the third and fourth secondary modules 212, 214 using the common address x70. The instruction may be to disable error interrupts. The third and fourth secondary modules 212, 214 may process the instruction comprising the common address x70 and disable error interrupts, for example over the IRQ line 205 (if provided).

At step 924, the main module 206 may check whether interrupts were received, for example over the IRQ line 205.

At step 926, the main module 206 may transmit an instruction using the common address x68 intended for the first and second secondary modules 208, 210 to disallow broadcasts and disable their common address x68. Upon detection of the common address x68 on the data line 206, the first and second secondary modules 208, 210 may disable use of the common address x68.

At step 928, the main module 206 may then transmit an instruction over the data line 206 using the common address x70 intended for the third and fourth secondary modules 212, 214 to disallow broadcasts and disable their common address x70. Upon detection of the common address x70 on the data line 206, the third and fourth secondary modules 212, 214 may disable use of the common address x70.

Thus, the above process when applied to the changing orientation of the device 700 may reconfigure the four secondary modules 208, 210, 212, 214 using many less instructions than would be required to reprogram these modules using the conventional architecture 100 shown in FIG. 1.

The exemplified embodiments shown in FIGS. 7 to 9 provides just one example of an application of embodiments of the present disclosure. It will be appreciated that embodiments of the disclosure may be applied to any use case in which multiple secondary modules on a two-wire bus are to be reconfigured using the same instructions or parameters. For example, a change in an audio output mode in the device 700, such as from a voice call to music playback or vice versa may require a change in parameters of the amplifiers 208a, 210a, 212a, 214a. Such reconfiguration may be performed using methods described herein.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A device, comprising:
   a main module;
   a plurality of secondary modules; and
   a data bus configured to enable data transmission between the main module and the plurality of secondary modules over a data line of the data bus;
   wherein each of the plurality of secondary modules is configured with a unique address, the unique address used by the main module to communicate with the respective secondary module over the data line;
   wherein the main module is operable to configure a first two or more of the plurality of secondary modules with a first common address for simultaneous data transmission from the main module to the first two or more of the plurality of secondary modules over the data line;
   wherein configuring of the first two or more of the plurality of secondary modules with the first common address comprises enabling or disabling the first common address or assigning the first common address to the first two or more of the plurality of secondary modules; and
   wherein the main module is configured to enable or disable or assign the first common address during a firmware update of the first two or more of the plurality of secondary modules.

2. The device of claim 1, wherein the data bus is a two-wire bus comprising the data line for transmission of data signals and a clock line for transmission of clock signals.

3. The device of claim 1, wherein the main module is operable to configure the first two or more of the plurality of secondary modules with the first common address during start-up of the main module.

4. The device of claim 1, wherein the main module is operable to configure the first two or more of the plurality of secondary modules with the first common address during a transition event associated with the device.

5. The device of claim 4, wherein the transition event comprises one of:

a. a transition between a voice call and music playback;
b. a change in device orientation.

6. The device of claim 1, wherein configuring of the first two or more of the plurality of secondary modules with the first common address comprises assigning the first common address to the first two or more of the plurality of secondary modules.

7. The device of claim 1, wherein the main module is further configured to transmit data simultaneously over the data line to the first two or more of the plurality of secondary modules over the data line using the first common address.

8. The device of claim 7, wherein subsequent to transmitting data to the first two or more of the plurality of secondary modules, the main module is configured to monitor for an error signal from one or more of the first two or more of the plurality of secondary modules.

9. The device of claim 8, further comprising an interrupt line, the main module configured to monitor for the error signal on the interrupt line.

10. The device of claim 1, wherein the main module is operable to configure a second two or more of the plurality of secondary modules with a second common address for simultaneous data transmission from the main module to the second two or more of the plurality of secondary modules over the data line.

11. The device of claim 1, wherein the plurality of secondary modules each comprise an amplifier.

12. The device of claim 11, further comprising a plurality of transducers, wherein each amplifier is configured to drive one of the plurality of transducers.

13. The device of claim 1, wherein the main module comprises an application processor.

14. The device of claim 1, wherein the device comprises one of a mobile computing device, a laptop computer, a tablet computer, a games console, a remote control device, a home automation controller or a domestic appliance, a toy, a robot, an audio player, a video player, or a mobile telephone, and a smartphone.

15. A data bus configured to enable data transmission between a main module to a plurality of secondary modules over a data line of the data bus;
   wherein each of the plurality of secondary modules is configured with a unique address used by the main module to communicate with the respective secondary module;
   wherein a first two or more of the plurality of secondary modules have a common address configurable by the main module for transmission of data simultaneously to the first two or more of the plurality of secondary modules over the data line;
   wherein configuring of the first two or more of the plurality of secondary modules with the first common address comprises enabling or disabling the first common address or assigning the first common address to the first two or more of the plurality of secondary modules; and
   wherein the main module is configured to enable or disable or assign the first common address during a firmware update of the first two or more of the plurality of secondary modules.

16. A main module configured to communication with a plurality of secondary modules via a data bus comprising a data line;
   wherein the main module is configured to communicate with each of the plurality of secondary modules using a unique address associated with each respective secondary module;
   wherein the main module is operable to configure a first two or more of the plurality of secondary modules with a first common address for simultaneous data transmission from the main module to the first two or more of the plurality of secondary modules over the data line;
   wherein configuring of the first two or more of the plurality of secondary modules with the first common address comprises enabling or disabling the first common address or assigning the first common address to the first two or more of the plurality of secondary modules; and
   wherein the main module is configured to enable or disable or assign the first common address during a firmware update of the first two or more of the plurality of secondary modules.

17. A secondary module configured to communicate with a main module via a data bus comprising a data line;
   wherein the secondary module is configured with a unique address used by the main module to communicate with the secondary module;
   wherein the secondary module is configurable with a common address shared between the secondary module and one or more other secondary modules configured to communicate with the main module via the data bus;
   wherein the common address is configurable by the main module for transmission of data simultaneously to the secondary module and the one or more other secondary modules over the data line;
   wherein configuring of the secondary module and the one or more other secondary modules with the common address comprises enabling or disabling the common address or assigning the common address to the secondary module and the one or more other secondary modules; and
   wherein the main module is configured to enable or disable or assign the first common address during a firmware update of the secondary module and the one or more other secondary modules.

18. A method of data transmission over a data bus configured to enable data transmission between a main module and a plurality of secondary modules over a data line of the data bus, the method comprising:
   configuring each of the plurality of secondary modules with a unique address, the unique address used by the main module to communicate with the respective secondary module over the data line; and
   configuring, using respective unique addresses, a first two or more of the plurality of secondary modules with a first common address for simultaneous data transmission from the main module to the first two or more of the plurality of secondary modules over the data line;
   wherein configuring of the first two or more of the plurality of secondary modules with the first common address comprises enabling or disabling the first common address or assigning the first common address to the first two or more of the plurality of secondary modules; and
   wherein the main module is configured to enable or disable or assign the first common address during a firmware update of the first two or more of the plurality of secondary modules.

19. A device, comprising:
a main module;
a plurality of secondary modules; and
a data bus configured to enable data transmission between the main module and the plurality of secondary modules over a data line of the data bus;

wherein each of the plurality of secondary modules is configured with a unique address, the unique address used by the main module to communicate with the respective secondary module over the data line;

wherein the main module is operable to configure a first two or more of the plurality of secondary modules with a first common address for simultaneous data transmission from the main module to the first two or more of the plurality of secondary modules over the data line;

wherein the main module is operable to configure the first two or more of the plurality of secondary modules with the first common address during a transition event associated with the device; and wherein the transition event comprises one of:
- a transition between a voice call and music playback; and
- a change in device orientation.

\* \* \* \* \*

UNITED STATES PATENT AND TRADEMARK OFFICE
CERTIFICATE OF CORRECTION

| | | |
|---|---|---|
| PATENT NO. | : 11,567,848 B2 | Page 1 of 1 |
| APPLICATION NO. | : 17/106324 | |
| DATED | : January 31, 2023 | |
| INVENTOR(S) | : Whyte et al. | |

It is certified that error appears in the above-identified patent and that said Letters Patent is hereby corrected as shown below:

In the Claims

In Column 15, Line 61, in Claim 16, delete "communication" and insert -- communicate --, therefor Signed and Sealed this
Thirteenth Day of June, 2023

Katherine Kelly Vidal
*Director of the United States Patent and Trademark Office*